United States Patent [19]

Perjes

[11] 4,166,600
[45] Sep. 4, 1979

[54] PIPE HANGERS

[76] Inventor: Raymond Perjes, 77 rue d'Enghien A6, Epinay, France, 93800

[21] Appl. No.: 823,849

[22] Filed: Aug. 11, 1977

[51] Int. Cl.² .............................................. F16L 3/14
[52] U.S. Cl. ...................................... 248/59; 248/62
[58] Field of Search .................... 248/58, 59, 60, 62, 248/327; 24/19, 23 B

[56] References Cited

U.S. PATENT DOCUMENTS

| | | | |
|---|---|---|---|
| 566,690 | 8/1896 | Kling | 248/62 |
| 702,704 | 6/1902 | Carll | 248/59 |
| 705,971 | 7/1902 | Smart | 248/62 X |
| 1,579,419 | 4/1926 | Tomkinson | 248/59 |
| 1,698,571 | 1/1929 | Van Cleve | 248/62 |
| 1,769,015 | 7/1930 | Carpenter | 248/58 |
| 1,924,353 | 8/1933 | Fitzpatrick | 248/59 |
| 1,980,620 | 11/1934 | Haswell | 24/23 B |
| 2,762,592 | 9/1956 | Adams | 248/59 |
| 3,507,270 | 4/1970 | Ferrier | 24/19 X |

FOREIGN PATENT DOCUMENTS

| | | | |
|---|---|---|---|
| 1490983 | 6/1967 | France | 248/59 |
| 7513267 | 5/1977 | Netherlands | 248/59 |

Primary Examiner—Rodney H. Bonck
Attorney, Agent, or Firm—Lee C. Robinson, Jr.

[57] ABSTRACT

This invention relates to pipe hangers for suspending pipes, ducts and the like from an overhead surface such as a ceiling or a beam, and comprises a metal strip which is bent over at both its extremities and a buckle having a central cut out to receive a threaded rod and said bent-over ends of said metal strip. Nut means are threaded on the rod to clamp all said parts of said hanger together. The buckle may be located above the nut means in the normal position of use of the hanger, and the ends of the strip run up over the top of the buckle on the outside and descend into the central cut-out against the threaded rod and are finally compressed between the buckle and the nut means, whereby the greater the weight of the supported pipe, the greater is the compression exerted by the strip on its own ends via the buckle.

Alternatively, although the buckle is still located above the nut means in the normal position of use of the hanger, the ends of the strip run up through the inside of the central cut-out in the buckle beside the threaded rod and are finally folded back over the top of the buckle.

11 Claims, 8 Drawing Figures

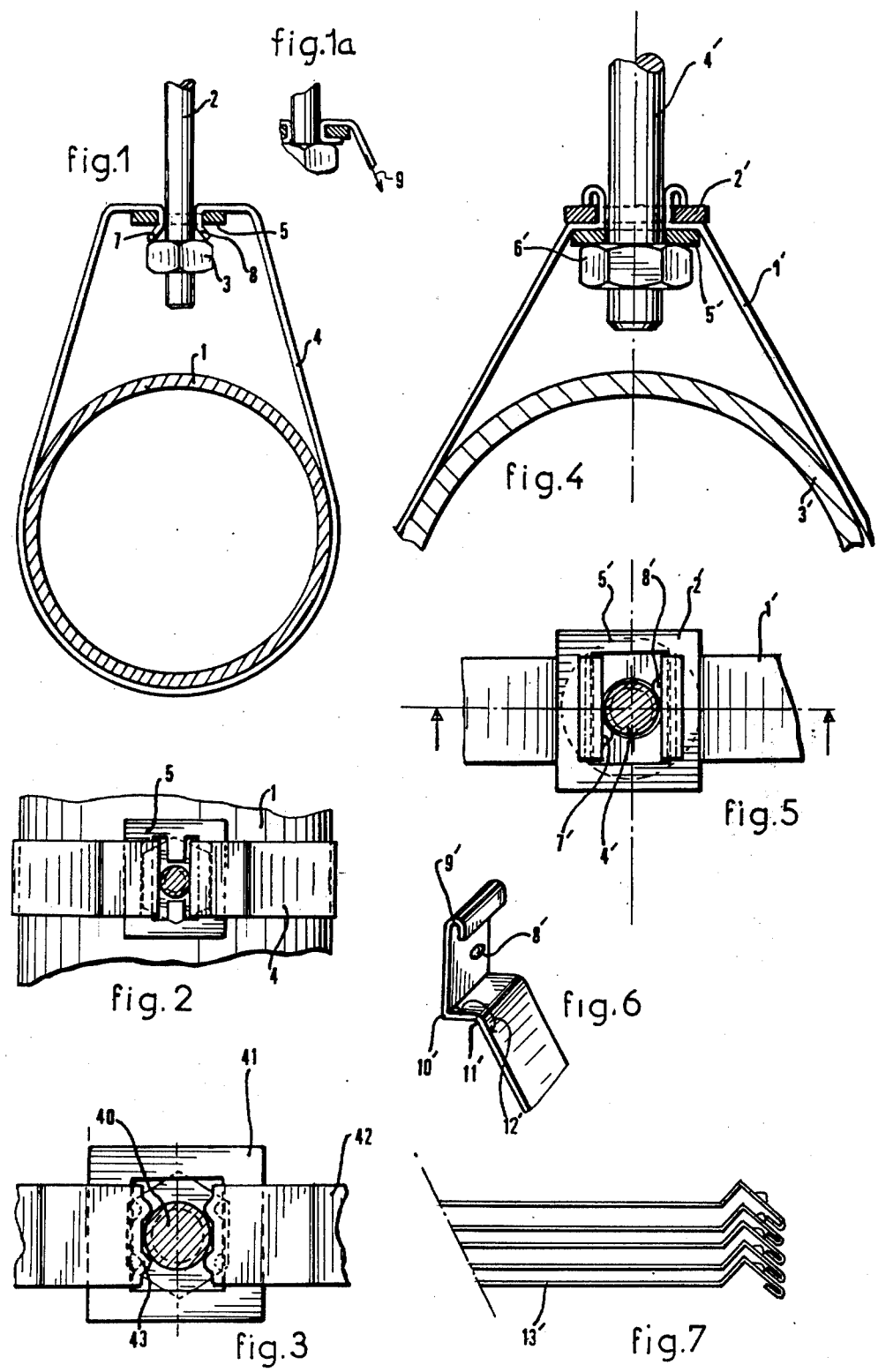

PIPE HANGERS

BACKGROUND OF THE INVENTION

The present invention relates to fittings used in permanent constructions and more particularly to pipe hangers for hanging various pipes and ducts. There are various kinds of known pipe hangers which are intended to embrace one or more pipes to enable them to be hung from a ceiling for example or from beams by means of a threaded rod, previously installed in the building, and a nut. A first known kind of pipe hanger comprises a metal strip which is circularly apertured near each of its ends, which ends may be folded at a more or less obtuse angle. The technique of hanging a pipe consists in this case of positioning the pipe below the threaded rod, looping the strip round the pipe, inserting the threaded rod into each of the aperatures in succession and screwing up a nut on the rod. One disadvantage of a device of this nature is the fact that the tensile strength of the strip is dictated by its minimum width at right angles to the apertures. As a result, either there is weakness in the strip if it is of normal width elsewhere or else the strip is made excessively wide to allow for the strength dictated by its width at right angles to the apertures. A way around this deficiency has been found by widening the strip at right angles to the apertures but this causes a considerable increase in the cost of the device. Proposals have also been made for a second, unapertured strip the ends of which match the shape of a machine-made part which acts as a nut, being held against this part by a ring on the outside. The disadvantages of devices of this second kind are that they take a long time to fit and are comparatively costly.

It is a primary object of the invention to remove or minimise these disadvantages.

SUMMARY OF THE INVENTION

The invention is characterized by a pipe hanger comprising a metal strip which is bent over at both its extremities and a buckle means having a central cut-out to receive a threaded rod and said bent-over ends of said metal strip, and nut means threaded on said rod to clamp all said parts of said hanger together.

In a first embodiment, said ends of the strip run up over the top of the said buckle means on the outside and then descend into the central cut-out in the buckle means against the threaded rod and are finally compressed between the buckle and the nut, as a result of which the greater the weight of the pipe encircled by the strip, then the greater is the compression exerted by the strip, via the buckle, on its own ends.

The advantages of a device of the kind according to the invention lie chiefly in the fact that the strip is produced simply by cutting it to length and by folding or otherwise shaping its ends. Broadly speaking the cut-out in the buckle means has two straight parallel sides against which the ends of the strip are able to bear, these sides being separated from one another by a distance very slightly greater than the sum of the diameter of the threaded rod and twice the thickness of the strip. In a simplified embodiment of the buckle means, this is in the form of a rectangle of sheet metal from which a second rectangle is cut out, by punching for example, the major dimension of the second rectangle also being very slightly greater than twice the thickness of the strip plus the diameter of the threaded rod, and its other dimension being very slightly greater than the diameter of the threaded rod.

In a modification which, broadly speaking, may be applied to any buckle of the device of the invention, the sides of the buckle which are intended to be situated underneath the ends of the strip are folded back at approximately 90° to the overall plane of the buckle so that the greatest thickness of these sides will be parallel to the direction of the tractive force exerted by the suspended pipe. This results in the buckle having the maximum stiffness in its horizontal plane for a given thickness of the sheet metal from which it is cut out. It may be mentioned that the simplified embodiment described above, although it has the advantage that the cutting out is simple, nevertheless has the slight drawback that if the strip is too wide the buckle will have a loose fit on the threaded rod. It is for this reason, to enable the threaded rod to be centralised in the buckle without making the width of the strip dependent on the diameter of the threaded rod, that two embodiments of the support strap of the invention are proposed which are provided with means for centralising the threaded rod in the buckle.

In a first example of the first embodiment, the said centralising means are carried by the buckle and to this end the central cut-out is an H-shaped cut-out which is distinguished from the rectangular cut-out of the previous embodiment by the presence of two tabs which project into the cut-out and whose inner edges are separated from one another by a distance very slightly greater than the diameter of the threaded rod, the function of these tabs being to centralise the threaded rod with respect to the buckle. In this embodiment the lateral cut-outs on either side of the tabs may thus be of arbitrarily selected lengths to allow as wide a strip as desired to pass through.

In a second example of the first embodiment, the said centralising means are carried by the strip and are formed by pairs of bulges each situated near one end of the strip between first and second folds, the said bulges being intended to be situated to left and right of the threaded rod and then on either side of it, with the result that the rod is centralised with respect to the strip, which in turn is located with respect to the buckle in both directions in the plane of the buckle.

The pipe hangers just referred to above are easy to produce and their manufacturing cost is modest. However, they are not sufficiently strong when it is a question of hanging very heavy piping. It is for this reason that the invention includes a second embodiment of the support strap which is more resistant to strains and which enables the most severe demands to be met. The second embodiment of the pipe hanger is chiefly characterised in that the buckle is intended to be situated above the nut while the ends of the strip run up through the inside of the central cut-out in the buckle beside the threaded rod and are finally folded over the top of the buckle. In this embodiment the cut-out in the buckle has two straight parallel sides against which the ends of the strip are able to bear, these sides being separated from one another by a distance very slightly greater than the sum of the diameter of the threaded rod and twice the thickness of the strip, and each end of the strip is bent over in three folds, the first fold being that closest to the end. The first fold preferably forms a very acute angle of close to 0°, the second fold forms a right angle, and the third fold forms an obtuse angle of approximately 140°. This second embodiment of pipe hanger is also characterised to a subsidiary extent by at least one bulge with which the strip is provided at each end between the first and second folds, the said bulge at each end being situated near to one edge of the strip in the case of a first end and near the other edge of the strip in the case of the other end.

It may be mentioned that by virtue of the configuration of the folds in the second embodiment which enable one strip to be placed beside and to fit into an adjoining strip, the strip may be supplied in the flat stacked with a number of other identical strips, which means firstly that the bulk of a batch of strips is minimal and secondly that the strips can be bent when required to suit the diameter of the pipes or ducts to be supported.

BRIEF DESCRIPTION OF THE DRAWINGS

In order that the invention may be more clearly understood, reference will now be made to the accompanying drawings, which show two embodiments thereof by way of example and in which:

FIG. 1 is an elevation view of a first example of the first embodiment of a pipe hanger according to the invention with certain portions shown in section, FIG. 1a is an enlarged fragmentary elevation view of a portion of the embodiment illustrated in FIG. 1, FIG. 2 is a fragmentary plan view of the hanger of FIG. 1 from above, FIG. 3 is a fragmentary plan view from above of a second example of said first embodiment, FIG. 4 is an elevation view of part of a second embodiment of pipe hanger according to the invention with certain portions shown in section, FIG. 5 is a fragmentary plan view of the hanger of FIG. 4 from above, FIG. 6 is a perspective view of a strip-end, and FIG. 7 is an edge-on view of strips as used in the second embodiment when stacked before use.

DETAILED DESCRIPTION OF PREFERRED EMBODIMENTS

Referring now to the drawings, in FIGS. 1 and 2 there is shown a pipe hanger for hanging at least one duct or pipe such as 1 by means of a nut 3 and a threaded rod 2 which may be inset in masonry or welded or screwed to a girder (not shown). The hanger includes a strip 4 which is bent over near each of its ends and a buckle 5 which is provided with a central cut-out for the threaded rod and the bent over ends of the strip to pass through. When the hanger is in the position of use, the buckle 5 is situated above the nut and the ends of the strip pass over the top of the sides of the buckle on the outside and descend into the central cut-out against the threaded rod, as can clearly be seen in FIG. 1, with segments 7 and 8 at the ends of the strip being situated between the buckle and the nut. When a tractive force (arrow 9) is applied to the strip, by for example screwing the nut 3 up on the threaded rod 2, the segments 7 and 8 at the ends are folded up under the buckle 5 and are compressed between the buckle and the upper face of the nut, being compressed the harder the greater the tractive force (due to the weight of the pipe). This results in the ends of the strip being automatically crimped onto the buckle, which may be supplemented if the passage for the ends of the strip between the buckle and the rod is sufficiently narrow, by the thread on the rod digging into the strip slightly due to the fact that the fold in the end segment does not take place at an exact right angle but with a slight curvature of the whole end portion.

In FIG. 3, which may be compared with FIGS. 1 and 2 but which is to a larger scale, is shown a second example of the first embodiment of the hanger according to the invention in which the means for centralising the threaded rod 40 with respect to the buckle 41 and the strip 42 are carried not by tabs on the buckle as shown in FIG. 2, but by the strip. These centralising means are formed by two pairs of bulges such as 43 which are each situated near one end of the strip. It may be mentioned that one bulge at each end is sufficient to centralise the threaded rod in the buckle provided however that each bulge is situated on the opposite side of the strip from the other bulge so that when the strip is fitted into the buckle against the threaded rod the two bulges are diametrically opposed with respect to the axis of the rod.

FIGS. 4, 5 and 6 show a second embodiment of the invention comprising in general a strip 1' and a buckle 2' and the hanger is intended to hang a pipe 3' from a ceiling for example, by means of a threaded rod 4'. In this second and preferred, embodiment, when the hanger is in place, each end of the strip passes over the top of a washer 5' supported by the nut 6' and runs up through the inside of the central cut-out in the buckle beside the threaded rod and is finally folded over onto the top of the buckle.

In FIG. 5 in particular are shown two bulges 7' and 8' with which the ends of the strip are respectively provided, the bulges being situated near one edge of the strip in the case of a first end and near the other edge in the case of the other end. As can clearly be seen in the Figure, the bulges enable the buckle 2' and the strip 1' to be locked in position with respect to the threaded rod 4'.

In FIG. 6 is shown what is meant by a strip-end. This end is bent over with three folds. The first fold 9' is that nearest the end and forms a very acute angle of close to 0° (it could also be said that the strip is folded back on itself). The second fold 10' forms substantially a right angle and the third fold 11' forms an obtuse angle 12' of approximately 140°. It will be noted that the bulge 8' appears as a depression near one edge of the said strip between the first fold 9' and the second fold 10'.

In FIG. 7 a plurality of strips such as 13' as used in the second embodiment is stacked or nested on top of one another or next to one another to be packed and supplied in this state. It will be noted that the folding of the ends, only one of which can be seen in the Figure, permits this interengagement. It will also be noted that the strip is supplied with its central portion un-curved, which not only enables the space taken up by the strip to be reduced but also enables it to be curved at a later stage to the diameter of the pipe or duct to be supported.

Finally, it should be understood that the present invention is not restricted to the particular embodiments described above nor to the dimensions and proportions described but that various modifications may be made to the details set forth without in any way departing from its scope as defined by the appended claims.

I claim:

1. A pipe hanger for suspending a conduit from a threaded rod, the hanger comprising, in combination:

a flat strip which is bent at both its ends to form first and second folds in spaced relationship with each other adjacent each end, each of said ends including a portion which extends in a horizontal plane in the normal position of use of the hanger;

buckle means having a central cut-out for receiving the threaded rod and the ends of said flat strip;

nut means threaded on said rod to clamp the horizontal portion of each of said ends of said strip between said nut means and said buckle means, the weight of the conduit compressing each of said horizontal portions to firmly clamp the same between the buckle means and the nut means;

said buckle means being located above the said nut means in the normal position of use of the hanger, and said ends of said strip running up over the top of the said buckle means on the outside and descending into said central cut-out against said threaded rod and being finally compressed between said buckle means and said nut means, whereby the greater the weight of the supported pipe, the greater is the compression exerted by said strip on its own ends via said buckle means.

2. A pipe hanger for suspending a conduit from a threaded rod, the hanger comprising, in combination:

a flat strip which is bent at both its ends to provide first and second folds adjacent each end, each of said ends including a pair of bent portions extending in spaced horizontal planes;

a rectangular buckle having a central cut-out for receiving the threaded rod and the ends of said flat strip; and nut means threaded on said rod to clamp the bent portions of each of said ends of said strip between said nut means and said buckle, the horizontal bent portions at each end of the strip being respectively disposed above and below the buckle with the lowermost horizontal portion interposed between the buckle and the nut means, the weight of the conduit compressing said lowermost horizontal portion to firmly clamp the same between the buckle and the nut means.

3. A pipe hanger according to claim 2, wherein said cut-out in said buckle means is H-shaped having two straight parallel sides against which said ends of said strip are able to bear, said sides being separated from one another by a distance very slightly greater than the sum of the diameter of said threaded rod and twice the thickness of said strip.

4. A pipe hanger according to claim 2, wherein said buckle means is located above said nut means in the normal position of use of the hanger and said ends of said strip extend through the inside of said central cut-out in said buckle means beside said threaded rod.

5. A pipe hanger according to claim 4, wherein each end of said strip is bent over in three folds, the first fold being that closest to the end.

6. A pipe hanger for suspending a conduit from a threaded rod, the hanger comprising, in combination:

a flat strip which is bent at both its ends to form first, second and third folds in spaced relationship with each other adjacent each end, each of the ends of the strip including a strip portion which extends in a horizontal plane in the normal position of use of the hanger;

buckle means having a central cut-out for receiving the threaded rod and the first fold on each of the ends of said flat strip; and nut means threaded on said rod, each of the ends of said strip extending upwardly from said conduit over said buckle means, then downwardly along opposite sides of said threaded rod, and then outwardly with the horizontal portion clamped between said nut means and said buckle means, the weight of the conduit compressing said horizontal portion between the buckle means and the nut means.

7. A pipe hanger according to claim 6, wherein said first fold forms a right angle, said second fold forms a right angle, and said third fold forms an obtuse angle.

8. A pipe hanger according to claim 6 wherein said strip is provided with at least one bulge at each of its ends.

9. A pipe hanger for suspending a conduit from a threaded rod, the hanger comprising, in combination:

a flat strip which is bent at both its ends to form first and second folds adjacent each end, each of said ends including a portion which extends in a horizontal plane in the normal position of use of the hanger;

buckle means having a central cut-out for receiving the threaded rod and the ends of said flat strip;

nut means threaded on said rod to clamp the horizontal portion of each of said ends of said strip between said nut means and said buckle means; and means bearing against the threads of said rod for centering the ends of said strip on said rod, the centering means including a dimple on at least one of the ends of said strip, said dimple being spaced from the longitudinal center-line of the strip in position to engage the threads of said rod.

10. A pipe hanger for suspending a conduit from a threaded rod, the hanger comprising, in combination:

a flat strip which is bent at both its ends to provide first and second folds adjacent each end, each of said ends including a bent portion formed by at least one of said folds, said bent portion extending in a horizontal plane in the normal position of use of the hanger;

buckle means having a central cut-out for receiving the threaded rod and the ends of said flat strip;

nut means threaded on said rod to clamp the bent portion of each of said ends of said strip between said nut means and said buckle means; and centering means for maintaining the ends of said strip in position on said threaded rod, said centering means including a plurality of bulges on each of the ends of said strip for engaging the threads of said rod, each of said bulges being spaced from the longitudinal center-line of said strip.

11. A pipe hanger for suspending a conduit from a threaded rod, the hanger comprising, in combination:

a flat strip which is bent at both its ends to form first, second and third folds adjacent each ends, each of the ends of the strip being bent back on itself to form said first fold, said second and third folds being spaced apart to define a strip portion which extends in a horizontal plane in the normal position of use of the hanger, said second fold forming a right angle and said third fold forming an obtuse angle;

buckle means having a central cut-out for receiving the threaded rod and the first fold on each of the ends of said flat strip;

nut means threaded on said rod to clamp the horizontal portion of each of said ends of said strip between said nut means and said buckle means, the weight of the conduit compressing each of said horizontal portions to firmly clamp the same between the buckle means and the nut means; and centering means for maintaining the ends of said strip in position on said threaded rod, said centering means including at least one bulge on each of the ends of said strip for engaging the threads of said rod, each of said bulges being spaced from the longitudinal center-line of said strip.

* * * * *